United States Patent [19]

Onodera et al.

[11] Patent Number: 5,150,460
[45] Date of Patent: Sep. 22, 1992

[54] APPARATUS FOR CHARACTER OUTPUT WITH MODIFICATION OF CHARACTER CODE ARRAY

[75] Inventors: Ken Onodera, Yokohama; Shunji Saito, Tokyo, all of Japan

[73] Assignee: Canon Kabushiki Kaisha, Tokyo, Japan

[21] Appl. No.: 765,466

[22] Filed: Sep. 26, 1991

Related U.S. Application Data

[63] Continuation of Ser. No. 687,091, Apr. 19, 1991, abandoned, which is a continuation of Ser. No. 299,633, Jan. 23, 1989, abandoned.

[30] Foreign Application Priority Data

Feb. 1, 1988 [JP] Japan .................................. 63-19494

[51] Int. Cl.[5] ............................................. G06F 3/14
[52] U.S. Cl. ..................................... 395/151; 340/748
[58] Field of Search ................ 340/748, 750; 395/151, 395/150

[56] References Cited

U.S. PATENT DOCUMENTS

| | | | |
|---|---|---|---|
| 4,234,931 | 11/1980 | Kanaiwa et al. ..................... | 364/900 |
| 4,290,064 | 9/1981 | Traster ................................. | 340/723 |
| 4,367,533 | 1/1983 | Wiener ................................. | 364/519 |
| 4,413,558 | 11/1983 | Monma et al. ..................... | 101/93.14 |
| 4,439,761 | 3/1984 | Fleming et al. ..................... | 340/735 |
| 4,595,996 | 6/1986 | Morley et al. .................. | 364/521 X |
| 4,715,006 | 12/1987 | Nagata .................................. | 364/523 |
| 4,745,561 | 5/1988 | Hirosawa et al. ............. | 340/735 X |
| 4,763,118 | 8/1988 | Takai .................................... | 340/735 |

FOREIGN PATENT DOCUMENTS

| | | |
|---|---|---|
| 27566 | 4/1981 | European Pat. Off. . |
| 1016979 | 1/1966 | United Kingdom . |
| 1477429 | 6/1977 | United Kingdom . |
| 1487048 | 9/1977 | United Kingdom . |

OTHER PUBLICATIONS

W.I.P.O. 81/00471Aa, Traster, Feb. 19, 1981, especially pp. 1, 9, 16-17, 21-23.

Primary Examiner—David L. Clark
Attorney, Agent, or Firm—Fitzpatrick, Cella, Harper & Scinto

[57] ABSTRACT

This invention proposes an output apparatus for storing a plurality of internal character code data for accessing character fonts corresponding to input code data and outputting a character pattern on the basis of the internal character code data, wherein input command data is identified and some of the plurality of internal character code data may be changed on the basis of a change command.

11 Claims, 6 Drawing Sheets

APPARATUS FOR CHARACTER OUTPUT WITH MODIFICATION OF CHARACTER CODE ARRAY

This application is a continuation of application Ser. No. 07/687,091 filed Apr. 19, 1991, which is a continuation of application Ser. No. 07/299,633, filed on Jan. 23, 1989 both now abandoned.

BACKGROUND OF THE INVENTION

1. Field of the Invention

The present invention relates to an output apparatus for outputting image information such as characters and symbols, and more particularly relates to an apparatus to convert an input character code into an internal character code.

2. Description of the Related Art

In recent years, an output apparatus of this type utilizes a predetermined character conversion table for converting a character code sent from an external device such as a host computer into a corresponding internal character code. The character conversion table is an internal character conversion table for storing internal character codes in units of, e.g., bytes. In a printing mode, print character code data input from the host computer is converted into an internal character code on the basis of a character code system constituted by the character conversion table.

In a conventional output apparatus, character printing is performed on the basis of the character conversion table generated when the apparatus is powered.

In a conventional output apparatus, when printing is performed on the basis of another character code system, the output apparatus must be powered off, thus degrading operation efficiency.

U.S. Pat. No. 4,234,931 discloses a technique for calculating input character codes to generate new character codes. However, strong demand has arisen for a further improvement.

SUMMARY OF THE INVENTION

It is an object of the present invention to solve the conventional problems described above.

It is another object of the present invention to improve an output apparatus for outputting image information such as characters and symbols.

It is still another object of the present invention to provide an output apparatus for outputting information such as a character pattern without degrading operation efficiency.

It is still another object of the present invention to provide an output apparatus capable of outputting desired information.

It is still another object of the present invention to provide an output apparatus capable of operating on multiple size character codes, i. e; 8 bits, 16 bits, etc.

It is still another object of the present invention to provide an output apparatus for storing a plurality of internal character code data for accessing character fonts in correspondence with input code data and outputting a character pattern on the basis of the internal character code data, comprising means for inputting command data, means for identifying the input command data, and means for changing some of the plurality of internal character code data.

It is still another object of the present invention to provide an output apparatus for outputting a character pattern without degrading operation efficiency even if a character code system is changed.

It is still another object of the present invention to provide an output apparatus having a predetermined character code system to output a character pattern on the basis of the predetermined character code system, comprising means for storing a character code system obtained by arraying a plurality of internal character code data for accessing a font pattern, means for inputting command data, and means for changing some of the plurality of internal character code data on the basis of the input command data.

It is still another object of the present invention to provide an output apparatus having a predetermined character code system to output a character pattern on the basis of the predetermined character code system, comprising means for storing a character code system obtained by arraying a plurality of internal character code data for accessing a character font, and means for changing the internal character code data, wherein the storing means outputs the internal character code data in a plurality of modes.

Other features and advantages of the present invention will be apparent from the following description taken in conjunction with the accompanying drawings, in which like reference numbers designate the same or similar parts throughout the figures thereof.

DESCRIPTION OF THE PREFERRED EMBODIMENT

A preferred embodiment of the present invention will be described in detail with reference to the accompanying drawings.

Figure 1:
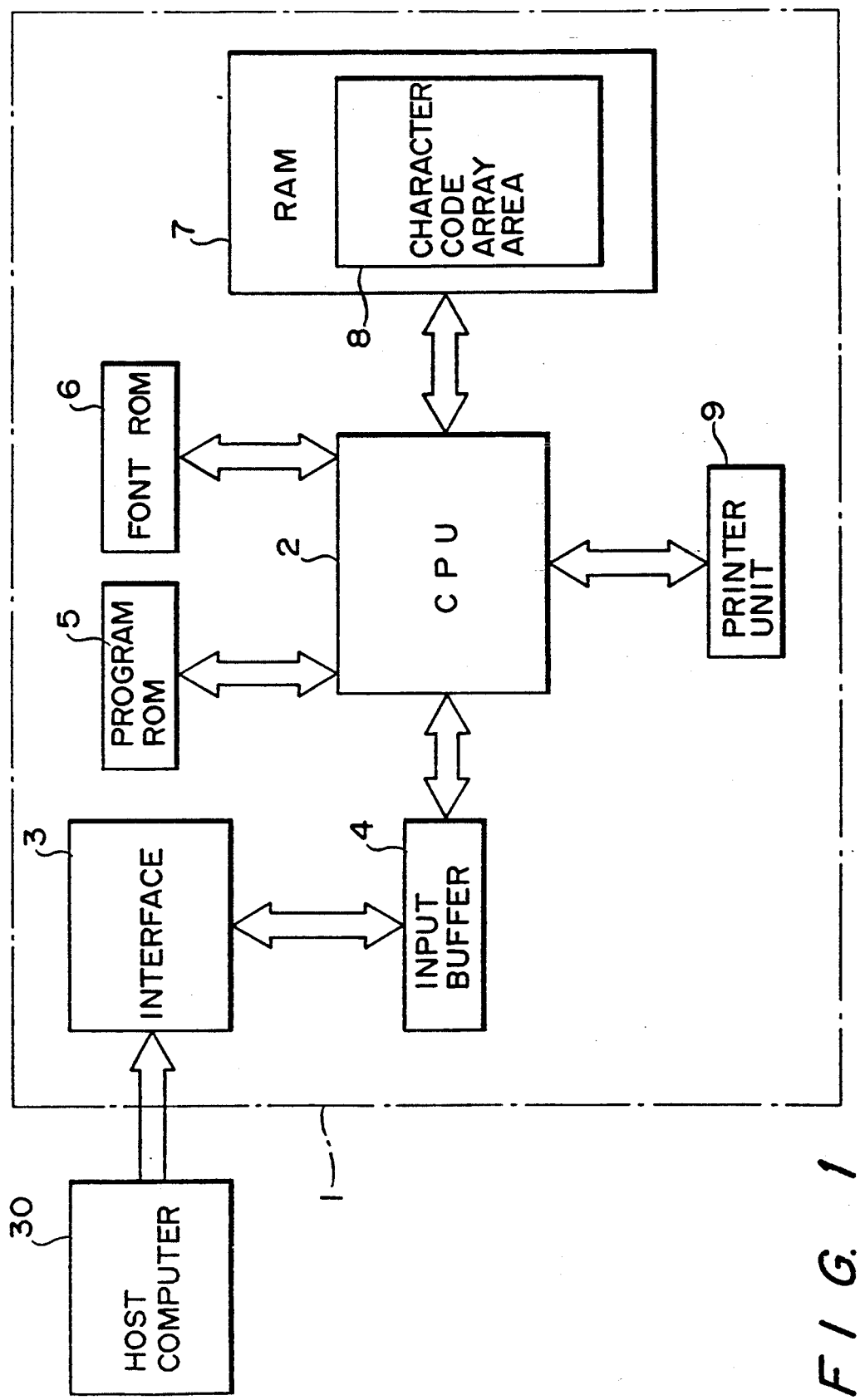
FIG. 1 is a block diagram showing an arrangement of a printing apparatus according to an embodiment of the present invention.

FIG. 1 is a block diagram showing an arrangement of a printing apparatus according to an embodiment of the present invention.

Figure 3:
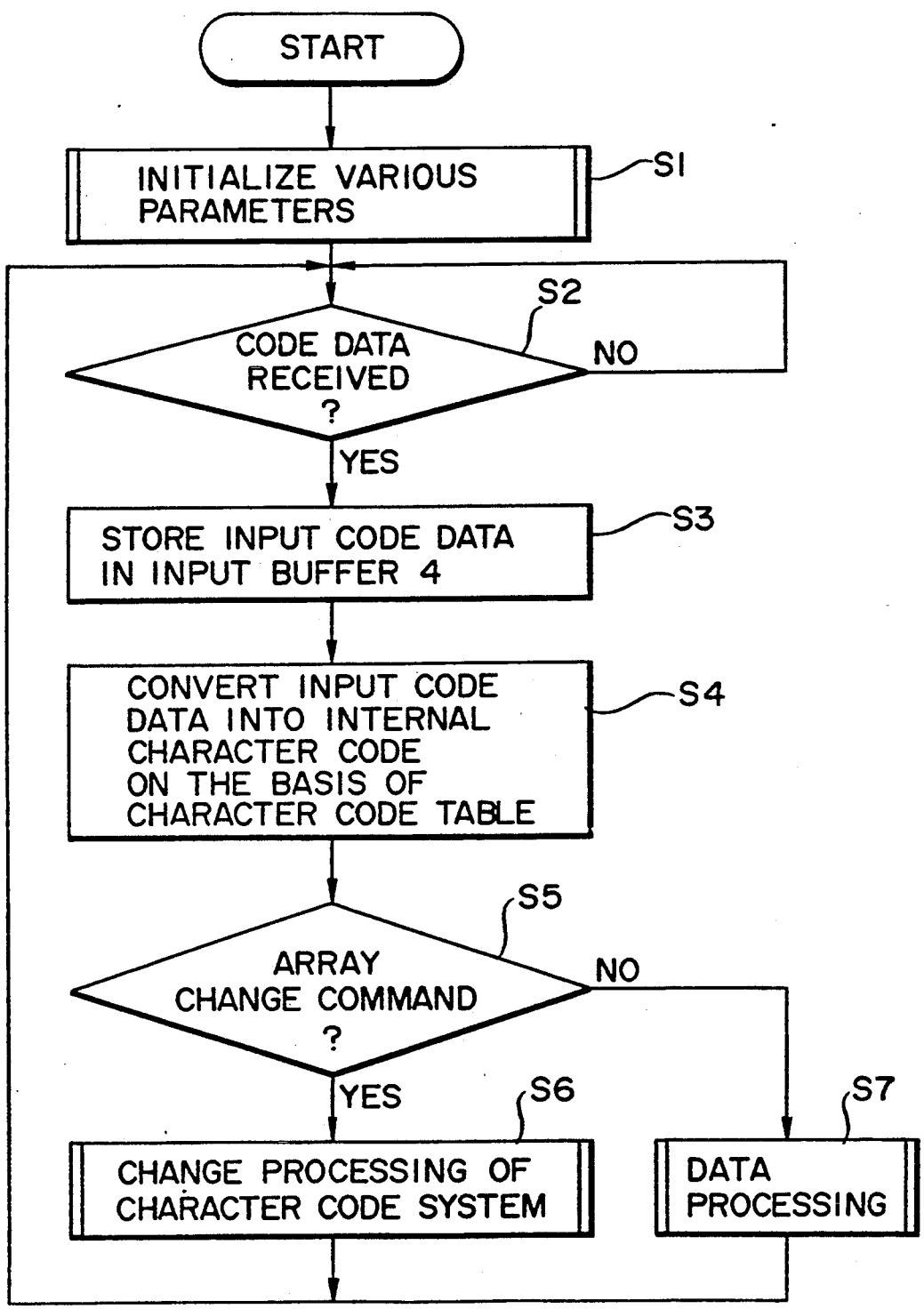
FIG. 3 is a flow chart showing a printing method of the embodiment shown in FIG. 1.

Reference numeral 1 in FIG. 1 denotes a printing apparatus; 2, a CPU for controlling overall operations of the printing apparatus 1; and 3, an interface for receiving various data from a host computer 30 serving as a host device Reference numeral 4 denotes an input buffer for temporarily storing a predetermined volume of code data (code data upon reception is called input code data) input from the host computer 30; 5, a program ROM for storing control programs, error processing programs, and programs for executing processing based on a flow chart of FIG. 3 (to be described later); and 6, a font ROM for storing pattern information corresponding to predetermined character codes.

Reference numeral 7 denotes a RAM serving as a working area for each program and a temporary saving area for error processing The RAM 7 includes a character code array area 8 for converting character information input from the host computer 30 into internal character code data used in the printing apparatus 1. More specifically, reference numeral 8 denotes a character conversion table for converting an external character code input from an external device into an internal character code. Reference numeral 9 denotes a printer unit for printing character information patterned by the font ROM 6 on recording paper.

An internal character code array format in the character code array area 8 will be described below.

Figure 2:
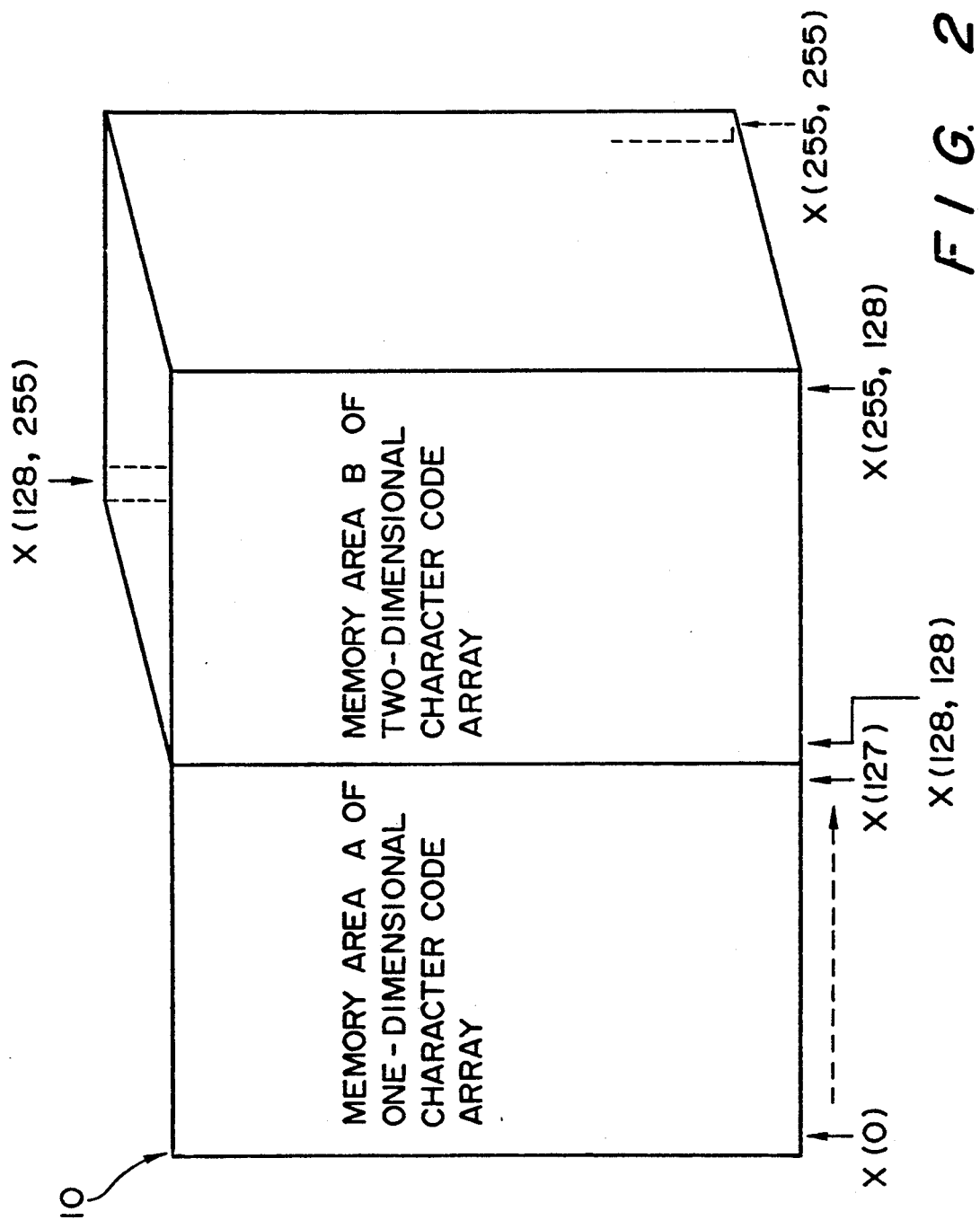
FIG. 2 is a view for explaining a character code system of the embodiment shown in FIG. 1.

FIG. 2 is a view for explaining a character code system of this embodiment Referring to FIG. 2, reference numeral 10 denotes a character code system including both a one-dimensional character code array for accessing a character font such as a letter or a numeral and a two-dimensional character code array for accessing a character font such as a Chinese character. For example, when the number of bits of a character code input to the printing apparatus 1 is 8, i.e., one-byte data, a memory area A of the one-dimensional character code array is used. However, when an internal character code is represented by two-byte data, a memory area B of the two-dimensional character code array is used.

An address signal for the one-dimensional character code array in the character code system 10 is represented by X(i) (where $0 < i < 127$). For example, when an input character code designates address "0", an address signal is defined as X(0) 128 one-dimensional internal character codes are stored as the one-dimensional character code array at addresses corresponding to the address signals X(0) to X(127). Each code is arrayed in the two-dimensional character code array by an address signal X(i,j) (where $128 < i\ 255$ and $128 < j < 255$). 16,384 two-dimensional internal character codes are stored as the two-dimensional character code array at addresses corresponding to the address signals X(128,128) to X(255,255). Therefore, the character code system of this embodiment consists of 16,512 internal character codes.

Printing processing using the character code system 10 will be described below.

FIG. 3 is a flow chart showing a printing method of this embodiment. It should be noted that printing processing includes printing and generation and change processing of the character code system.

When the printing apparatus 1 is powered, various parameters are initialized (step Sl). At the same time, an initial character code system is generated in the character code array area 8. More specifically, internal character code data corresponding to the one- and two-dimensional character code arrays are input on the basis of the program ROM 5. As shown in FIG. 2, the character code system 10 consisting of one- and two-dimensional internal character code arrays is generated. In generation of the character code system during initialization, if initial internal character code data stored in the program ROM 5 corresponds to input code data consisting of one-byte character code information, a one-dimensional character code array can be created When input code data consisting of 2-byte code data corresponds to initial internal character code data, a two-dimensional character code array is created.

These two character code arrays are combined to constitute a character code system The character code system is established inside the printing apparatus, thereby setting a state wherein data from the host computer 30 can be received.

When code data from the host computer 30 is received by the printing apparatus, the received input code data is stored in the input buffer 4 (steps S2 and S3). The input code data is converted into a predetermined internal character code on the basis of the initial character code system (step S4) The CPU 2 determines in step S5 whether the converted internal character code is an array change command for changing an array of the character code system. If YES in step S5, an array change mode is set, and change processing is performed (step S6). The flow then returns to step S2, and the printing apparatus receives new data from the host computer 30. If the received data represents an array change command, a change in internal character code array is repeated (steps S2 to S6). If the array change command is one-byte input code data, the internal character code array in the memory area A of the one-dimensional character code array is changed. However, when the array change command is 2-byte input code data, the internal character code array in the memory area B of the two-dimensional character code array is changed.

In order to determine whether the memory area A of the one-dimensional character code array or the memory area B of the two-dimensional character code array is accessed from the input code data, the MSB (most significant bit) value of the input code data is checked. If the MSB value is "0", the memory area A of the one-dimensional character code array is subjected to change processing. However, if the MSB value is "1", the memory area B of the two-dimensional character code array is subjected to change processing.

If NO in step S5, i.e., if the CPU 2 determines that the input code data does not represents an array change command, the input code data represents, e.g., a printing command for printing characters. When the printing command is received, character printing processing is performed in a normal printing mode (step S7). In this case, the input code data is converted into an internal character code on the basis of the character code system in the printing apparatus 1. The internal character code is patterned into a corresponding font pattern by the font ROM 6. A predetermined character is printed at the printer unit 9 in accordance with the patterned dot data. It should be noted that one-line printing is performed in printing processing when dot data of a line is formed. By repeating the operations in steps S2 to S7 (except for step S6), one-line printing processing may be performed. In particular, in step S5, when the array change mode or the printing mode is already set, the flow advances to step S6 under the condition that the input code data from the host computer 30 is set in the array change mode, or the flow advances to step S7 under the condition that the input code data is set in the printing mode. The operations corresponding to those of steps S2 and S3 are performed in each step S6 or S7.

If input code data is, e.g., 88B4 (hexadecimal notation) consisting of two bytes, this data indicates a two-dimensional array position X(136,180) having the 8th bit as a boundary in the already generated character code system. When an array position is addressed in this manner, the internal character code is changed and the input code data is converted into an internal character code. Steps S2 and S3 are repeated in accordance with a maximum number of bits of the input code data to be stored in the input buffer 4.

According to this embodiment, the character code system can be changed in real time without deenergizing the printing apparatus, and at the same time excellent printing can be performed without degrading operation efficiency.

Since the character code data in the printing apparatus can be changed on the basis of the input code data from the host computer, a printing character format can be arbitrarily set. Characters can be printed by the printing apparatus 1 in accordance with the character code system unique to it.

The internal character code data can be replaced with another in the character code system already stored in the output apparatus, and therefore, the character code system can easily be changed In this case, if two internal character codes subjected to replacement are selected, and one character code is replaced with the other character code. For example, in order to replace internal character codes at positions X(128,255) and X(255,128) in the two-dimensional array, an internal character code a at the position X(128,255) and internal character code b at the position X(255,128) are fetched, and the internal character codes a and b are written at the positions X(255,128) and X(128,255), respectively, thereby completing replacement processing. The number of internal character codes subjected to replacement is not limited to two, but can be three or more.

In particular, if part of the character code system is to be changed, all codes of the character code system generated in the printing apparatus need not be changed. In this case, only internal character codes included in the portion subjected to replacement are changed in accordance with a command from the host computer.

The dimensions of the arrays in the character code system are not limited to one and two dimensions. Input code data or the internal character code may be data of three or more dimensions.

The output apparatus according to the present invention is not limited to a printing apparatus having a printer unit, but is applicable to a display device for displaying characters on a CRT display. A character code system for a character display in display processing can be arbitrarily changed in real time in the same manner as in printing processing.

Replacement processing in step S6 will be described below.

Figure 4:
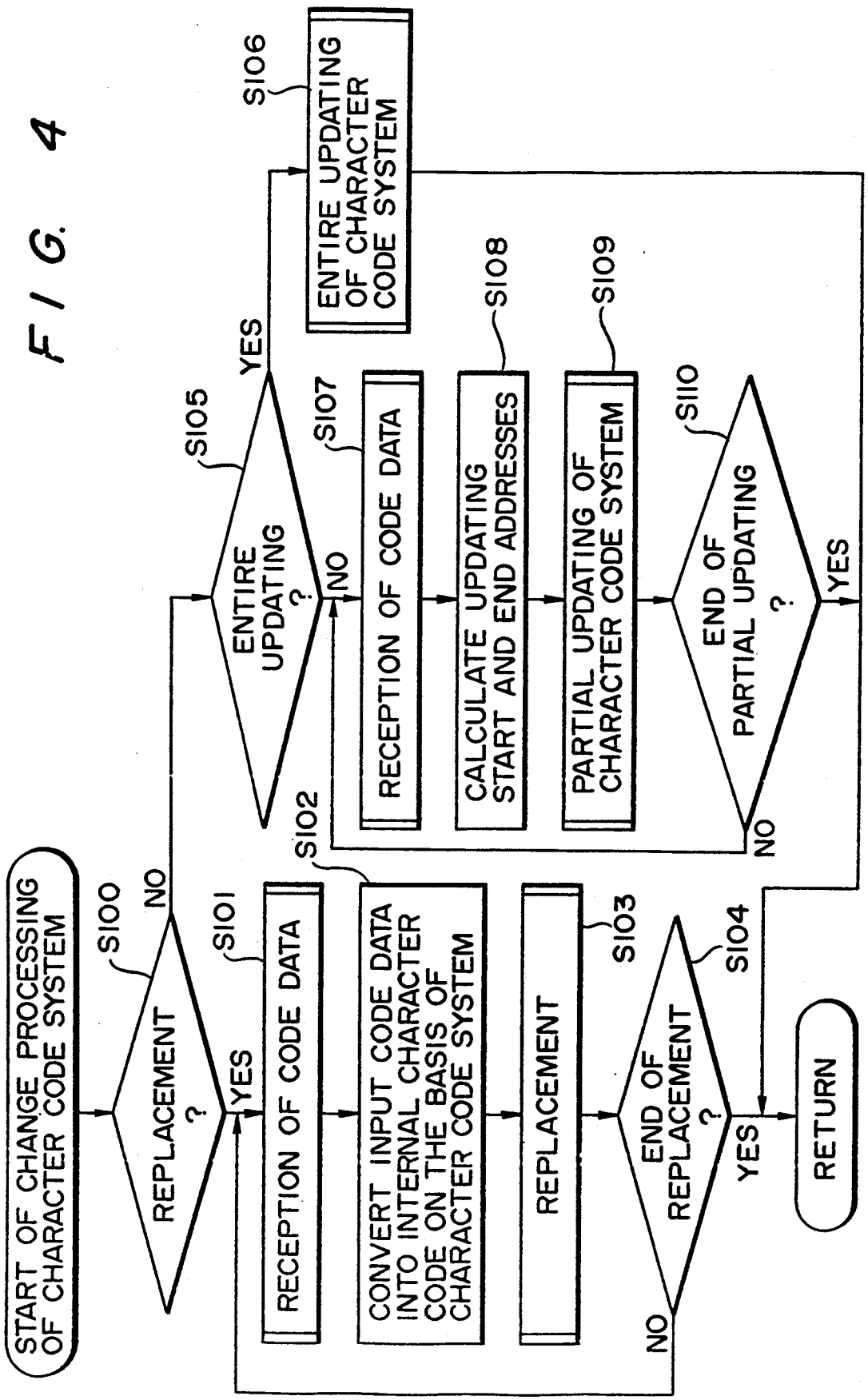
FIG. 4 is a flow chart for explaining change processing of the character code system of the embodiment shown in FIG. 1.

FIG. 4 is a flow chart for explaining change processing for a character code system of this embodiment.

In the array change mode, the CPU 2 identifies one of replacement processing within the character code system, entire updating in the character code system, and partial updating processing. If an identification result represents replacement processing (step S100), code data is input from the host computer 30 again (step S101), and internal character code data is read out from a memory area at an array address accessed by the input code data (step S102). If two internal character code data are to be replaced with each other, two code data are input and are converted into internal code data by the character code system. In this manner, the number of data subjected to replacement is determined, and replacement processing is performed (step S103). If replacement processing continues, the operations in steps S101 to S103 are repeated (step S104).

If the identification result represents entire updating processing in step S105, both one-dimensional and two-dimensional arrays of the character code system are entirely updated (step S106). However, if the identification result represents partial updating processing, two code data are input from the host computer 30 in order to input area information of the character code system (step S107). This area information represents an area of the character code system which is subjected to replacement. Start and end addresses for updating are obtained by the two input code data (step S108). If the input code data is one-byte data, the one-dimensional array is subjected to updating. However, if the input code data is two-byte data, the two-dimensional array is subjected to updating. When an updating area in the character code system is designated, new internal character code data is overwritten in this area (step S109). If another updating operation is required, steps S107 to S109 are repeated. It should be noted that the new internal character code used for updating may be generated by the ROM 5 or RAM 7 or input from the host computer 30.

In change processing within the character code system, replacement processing and updating processing (entire updating and partial updating) are performed. Therefore, the existing character code system can be easily changed into a character code system desired by the user. The character code system is exemplified by character type faces (e.g., italic and bold type faces).

A case wherein this embodiment is applied as a printing apparatus, i.e., a printer, will be described below.

Figure 5:
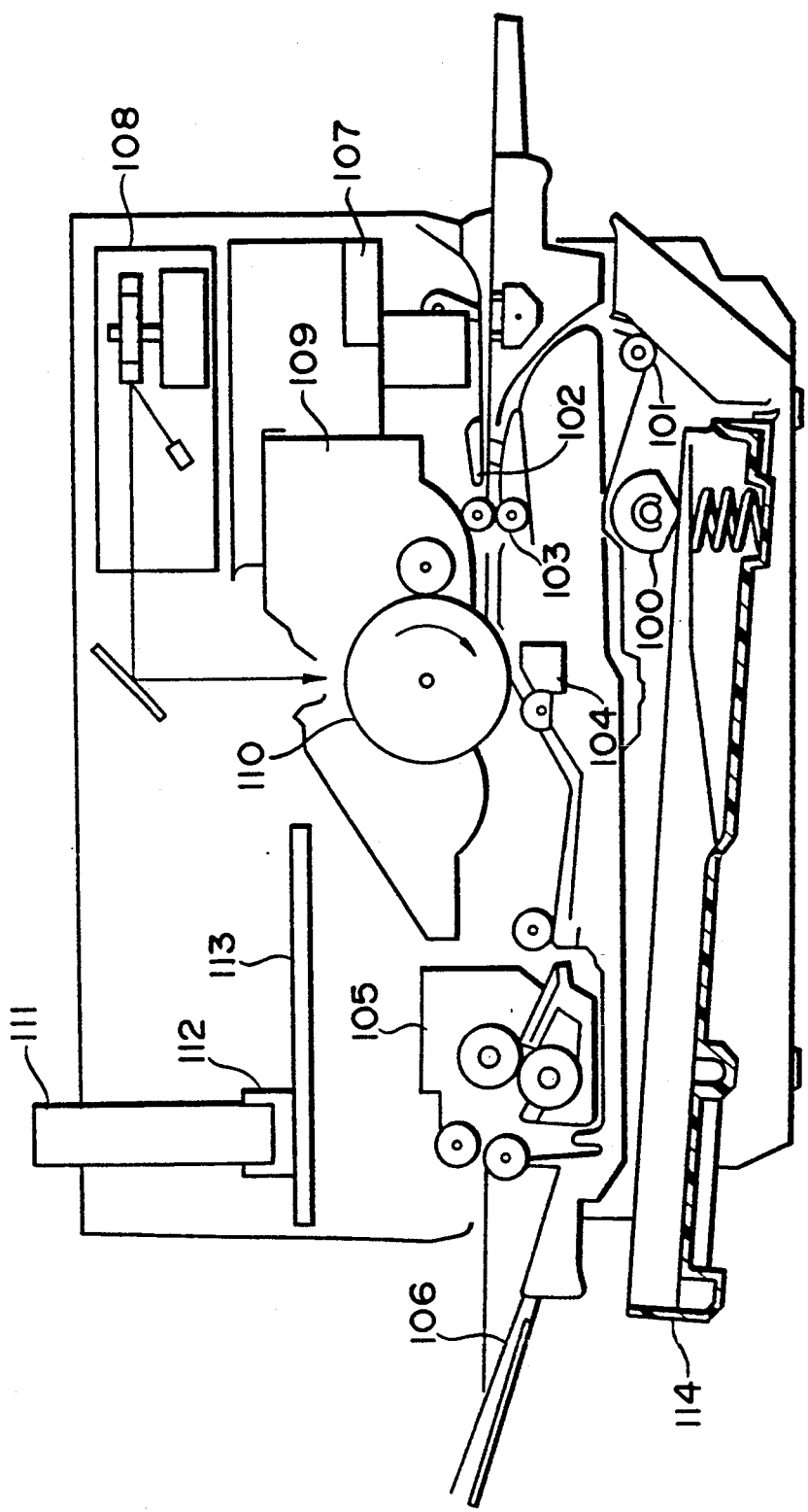
FIG. 5 is a side sectional view of a laser beam printer which can employ the embodiment shown in FIG. 1.

FIG. 5 is a side sectional view showing an arrangement of a laser beam printer which employs the above embodiment. The laser beam printer shown in FIG. 5 is also described in Japanese Patent Laid-Open (Kokai) No. 62-180058 (disclosed on Apr. 13, 1987). Referring to FIG. 5, reference numeral 108 denotes an exposure unit including a scanner and a laser unit; and 109, a developing unit for visualizing a latent image formed on a photosensitive drum 110. Reference numeral 100 denotes a sheet pickup roller for picking up sheets from a sheet cassette 114 to a convey roller 101 one by one. Each sheet conveyed through the convey roller 101 is temporarily stopped by a registration shutter 102. Projection of a laser beam and rotation of the photosensitive drum 110 are synchronized with sheet feeding. Reference numeral 103 denotes a feed roller pair for supplying a sheet to a transfer unit 104. Reference numeral 105 denotes a fixing unit for fixing a toner image transferred to the sheet; and 106, a stacker for receiving a delivered sheet. Reference numeral 111 denotes a character generator detachably mounted in the laser beam printer through a socket 112. Other character generators (not shown) in addition to the character generator 111 are arranged in the laser beam printer shown in FIG. 5 to generate plural types of character patterns. Reference numeral 113 denotes a CPU board on which the CPU 2, the ROMs 5 and 6, the RAM 7, and the like are mounted. In the laser beam printer having the arrangement described above, a series of operation timings such as a sheet convey timing and a development timing are controlled by a sequence controller 107. In the laser beam printer, the laser beam is ON/OFF controlled in response to a video signal output from the CPU board 113 to form a visible image on the photosensitive drum 110.

A series of electrophotographic processes in this laser beam printer are known to those skilled in the art, and the laser beam printer can be exemplified as an apparatus which can employ the present invention.

In this manner, even if plural types of characters are registered, the present invention is applied to a character code for accessing a desired type of character to change the font pattern.

A modification of the above embodiment will be described below

Figure 6:
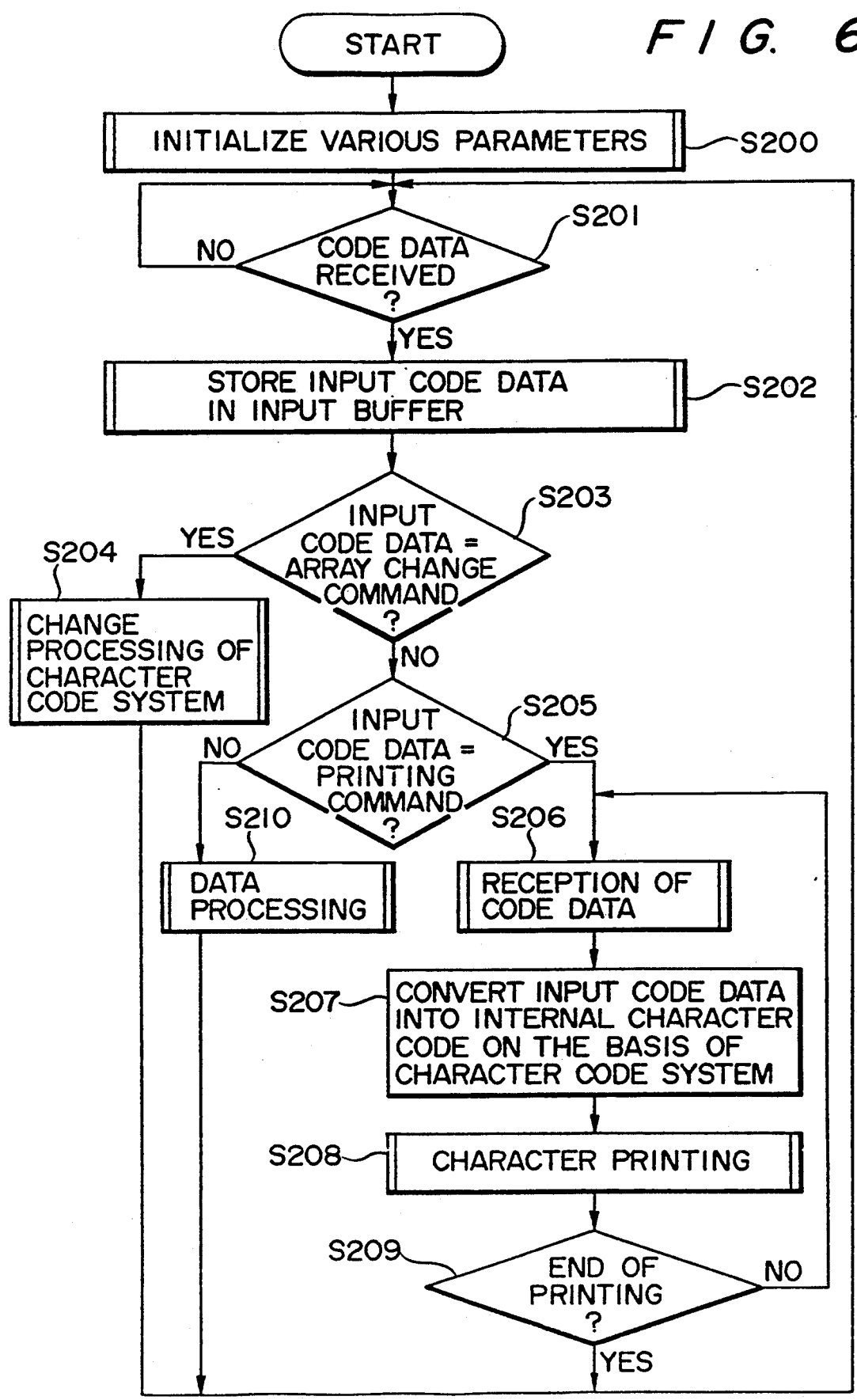
FIG. 6 is a flow chart showing a printing method of a modification of the embodiment shown in FIG. 1.

FIG. 6 is a flow chart showing a printing method according to a modification of the above embodiment. A printing apparatus 1' (not shown) of this modification has the same arrangement as in the above embodiment. The printing apparatus 1' comprises components from a CPU 2' (not shown) to a printer unit 9' (not shown) having the same functions as in the above embodiment. In particular, programs for performing processing on the basis of the flow chart in FIG. 6 are stored in a program ROM 5'. The modification describes a case wherein processing for converting input code data into internal character codes on the basis of the character code system is used for character printing processing. More specifically, in this modification, processing for converting the command data into the internal code data is omitted. The input code data is directly identified as an array change command or a printing command. In order to identify the command data, an operation control panel may be arranged in the printing apparatus, and command data may be manually input at the control panel. Alternatively, a signal representing a command may be received from a host computer 30 to determine whether the signal represents a command by an ON/OFF state of the signal.

Initialization of various parameters and checking of a reception state of data from the host computer are performed in the flow chart of FIG. 6 (steps S200 and S201). When code data is received from the host computer, the input code data is stored in an input buffer 4' (step S202). When the content of the input code data is identified as an array change command, the array change mode is set. Change processing of the character code system is repeated (steps S201 to S204).

If the content of the input code data is a printing command, code data reception processing corresponding to steps S206 and S207 are performed. The received input code data is converted into an internal character code of the character code system. The converted internal character code is patterned by a font ROM 6', and the patterned data is sent to a printer unit 9'. Predetermined printing processing is performed in the same manner as in the above embodiment (steps S206 to S209).

When neither change processing for the character code system nor printing processing are executed, normal data processing such as error processing is performed (step S210).

According to this modification, the character code system can be changed in real time without deenergizing the printing apparatus, and at the same time excellent printing can be performed without degrading operation efficiency in the same manner as in the above embodiment. Partial modifications performed in the above embodiment is applicable to the printing apparatus 1'.

It should be noted that the character code system is constituted by a combination of plural types of character code conversion tables and is set in the RAM 7 at the time of power-on operation. The basic character code conversion table may be prestored in the ROM 6 or the like.

What is claimed is:

1. An output apparatus comprising:
   storage means for storing plural characters arranged in plural arrays of respective dimensions, each said array having a dimension from one to n, inclusive;
   selection means for selecting one of the arrays of said storage means on the basis of the number of dimensions corresponding to input code data (m bytes (where $1<m, n$));
   retrieval means for retrieving one of the characters stored in said storage means on the basis of data of the $(m-s)$th byte of the code data (where $1 \leq s \leq m$); and
   pattern generating means for generating a character pattern corresponding to the character retrieved by said retrieval means.

2. An apparatus according to claim 1, further comprising external input means for inputting command data from an external device.

3. An apparatus according to claim 1, further comprising manual input means for manually inputting command data.

4. An apparatus according to claim 1, further comprising printing means for printing a character pattern of dots, on the basis of the character pattern generated by said pattern generating means.

5. An apparatus according to claim 1, further comprising memory control means for performing memory control after arranging the characters stored in said storage means in n dimensions in response to said output apparatus entering a power-on state.

6. An apparatus according to claim 1, wherein a plurality of said code data correspond to the one character code system.

7. An apparatus according to claim 2, wherein said external input means is structured and arranged for inputting, as part of the command data, command information for changing at least a portion of said characters.

8. An apparatus according to claim 3, wherein said external input means is structured and arranged for inputting, as part of the command data, command information for changing at least a portion of said characters.

9. An output method comprising the steps of:
   storing plural characters arranged in plural arrays of respective dimensions, each array having a dimension from one to n, inclusive;
   selecting one of the arrays stored in said storing step on the basis of the number of dimensions corresponding to input code data (m bytes (where $1<m<n$));
   retrieving one of the characters stored in said storing step on the basis of data of the $(m-s)$th byte of the code data (where $1 \leq s \leq m$); and
   generating a character pattern corresponding to the character retrieved in said retrieving step.

10. An apparatus according to claim 1, further comprising checking means for checking the number of dimensions corresponding to the input code data.

11. A method according to claim 9, further comprising the step of checking the number of dimensions corresponding to the input code data.

* * * * *

UNITED STATES PATENT AND TRADEMARK OFFICE
CERTIFICATE OF CORRECTION

PATENT NO. : 5,150,460
DATED : September 22, 1992
INVENTOR(S) : KEN ONODERA, ET AL.

It is certified that error appears in the above-identified patent and that said Letters Patent is hereby corrected as shown below:

COLUMN 2

Line 58, "device Reference" should read --device. Reference--.

COLUMN 3

Line 1, "processing The" should read --processing. The--.
Line 14, "embodiment Referring" should read --embodiment. Referring--.
Line 28, "0<i<127)." should read --$0 \leq i \leq 127$).--.
Line 30, "X(0) 128" should read --X(0). 128--.
Line 35, "128 <i 255" should read --$128 \leq i \leq 255$-- and "128 <j <255)." should read --$128 \leq j \leq 255$).--.
Line 62, "created When" should read --created. When--.
Line 67, "system The" should read --system. The--.

COLUMN 4

Line 8, "(step S4) The" should read --(step S4). The--.
Line 36, "represents" should read --represent--.

COLUMN 5

Line 15, "changed In" should read --changed. In--.

UNITED STATES PATENT AND TRADEMARK OFFICE
CERTIFICATE OF CORRECTION

PATENT NO. : 5,150,460
DATED : September 22, 1992
INVENTOR(S) : KEN ONODERA, ET AL.

It is certified that error appears in the above-identified patent and that said Letters Patent is hereby corrected as shown below:

<u>COLUMN 8</u>

Line 56, Boldface should be deleted.

Signed and Sealed this

Seventh Day of December, 1993

Attest:

BRUCE LEHMAN

*Attesting Officer*      Commissioner of Patents and Trademarks